(12) United States Patent
Holst et al.

(10) Patent No.: US 6,827,330 B2
(45) Date of Patent: Dec. 7, 2004

(54) PRESSURE REGULATING VALVE FOR A REFRIGERATING PLANT

(75) Inventors: Jørgen Holst, Mintebjergvej (DK); Jens Kristian Simonsen, Storegade (DK); Kurt Harck, Skråvej (DK)

(73) Assignee: Danfoss A/S, Nordborg (DE)

(*) Notice: Subject to any disclaimer, the term of this patent is extended or adjusted under 35 U.S.C. 154(b) by 300 days.

(21) Appl. No.: 09/952,666

(22) Filed: Sep. 13, 2001

(65) Prior Publication Data

US 2002/0038856 A1 Apr. 4, 2002

(30) Foreign Application Priority Data

Sep. 29, 2000 (DE) .......................... 100 48 816

(51) Int. Cl.$^7$ .............................. F16K 51/00
(52) U.S. Cl. ........................ 251/121; 251/325
(58) Field of Search ................ 251/325, 121

(56) References Cited

U.S. PATENT DOCUMENTS

| | | | | |
|---|---|---|---|---|
| 771,486 A | * | 10/1904 | McCarthy | 251/325 |
| 1,777,261 A | * | 9/1930 | Grainger et al. | 251/121 |
| 3,136,336 A | * | 6/1964 | Preismeyer | 251/325 |
| 3,198,479 A | * | 8/1965 | Greenwood | 251/121 |
| 4,523,436 A | | 6/1985 | Schedel et al. | |
| 4,834,133 A | | 5/1989 | LaCoste et al. | |
| 4,911,404 A | | 3/1990 | Dorste et al. | |
| 4,976,404 A | | 12/1990 | Ichikawa et al. | |
| 4,986,085 A | | 1/1991 | Tischer | |
| 5,090,450 A | * | 2/1992 | Pelech et al. | 251/325 |
| 5,174,320 A | * | 12/1992 | Allen | 251/325 |
| 5,439,030 A | * | 8/1995 | Cazcarra Pallaruelo | 251/121 |
| 5,715,704 A | | 2/1998 | Cholkeri et al. | |
| 5,964,248 A | | 10/1999 | Enarson et al. | |

FOREIGN PATENT DOCUMENTS

| | | |
|---|---|---|
| DE | 1431641 | 4/1976 |
| DK | 166169 | 6/1985 |
| EP | 147357 | 7/1985 |
| EP | 383353 | 8/1990 |
| EP | 714004 | 11/1994 |
| EP | 741257 | 11/1996 |
| EP | 0741257 A1 | 11/1996 |
| FR | 641621 | 8/1950 |
| GB | 894360 | 4/1962 |

* cited by examiner

Primary Examiner—John Bastianelli
(74) Attorney, Agent, or Firm—McCormick, Paulding & Huber LLP

(57) ABSTRACT

There is described a pressure regulating valve for a refrigerating plant, having a slider member that can be moved relative to a guide by means of a drive device, with variable throttle resistance being created between the guide and the slider member. The purpose of such a valve is to be able to control refrigerant over a relatively large throughput range, and the valve should be able to be manufactured inexpensively. For that purpose, the slider member and the guide co-operate in two sections of their movement relative to one another according to different valve principles.

13 Claims, 2 Drawing Sheets

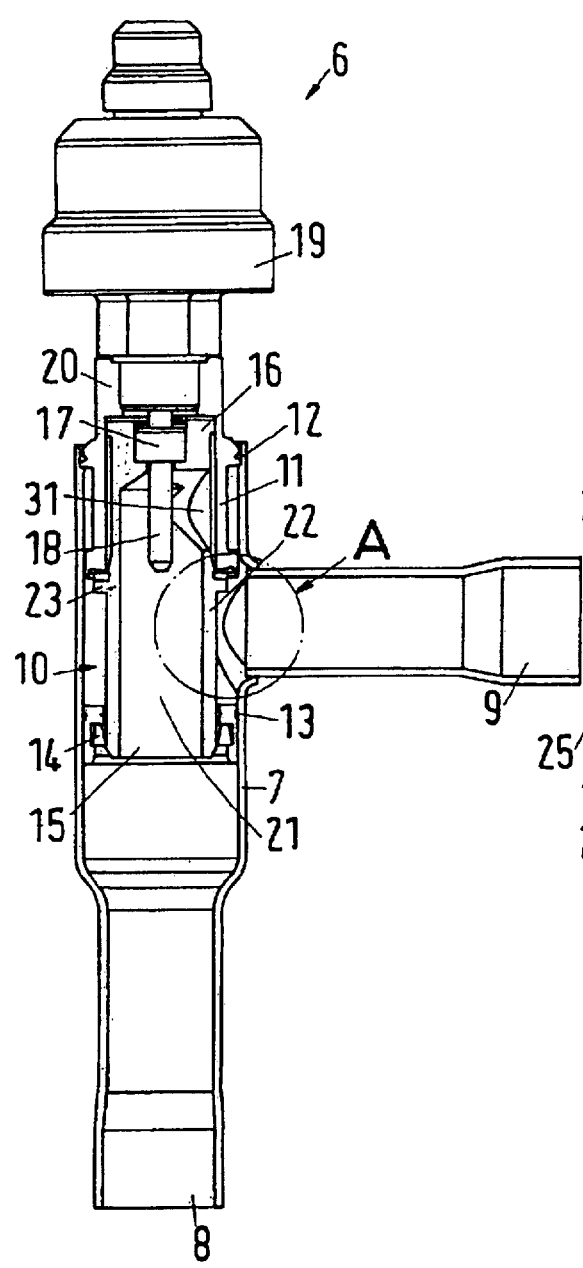
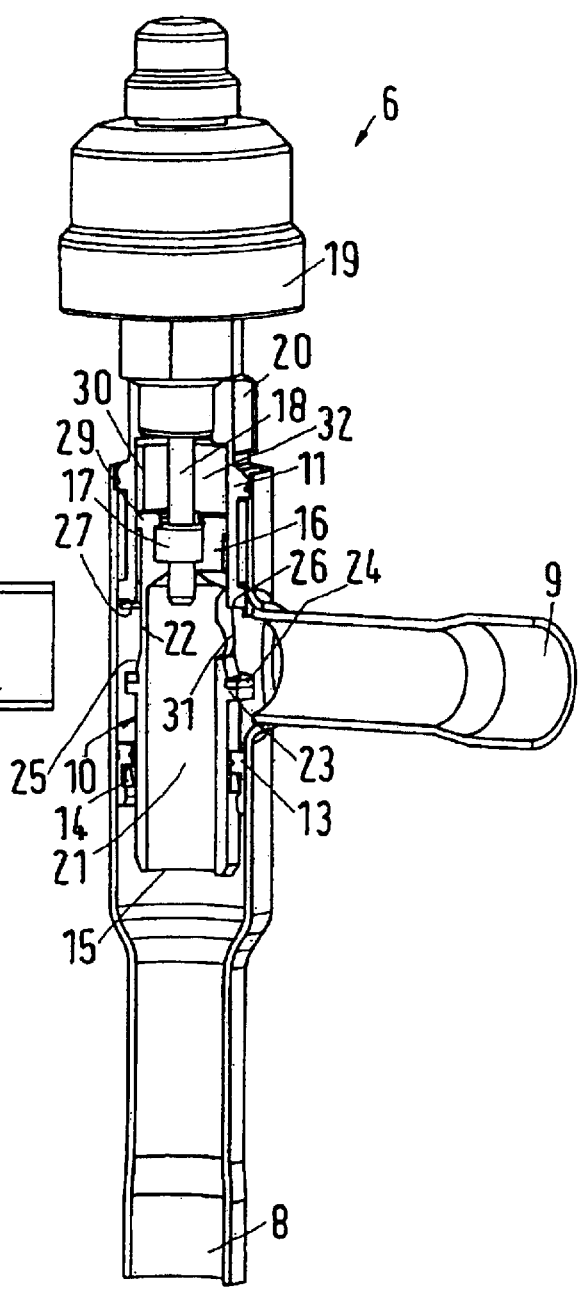

PRESSURE REGULATING VALVE FOR A REFRIGERATING PLANT

This application is entitled to the benefit of, claims priority from, and incorporates by reference subject matter disclosed in German Patent Application No. 10048816.1, filed on Sep. 29, 2000.

FIELD OF THE INVENTION

The invention relates to a pressure regulating valve for a refrigerating plant, having a slider member that can be moved relative to a guide by means of a drive device, with variable throttle resistance being created between the guide and slider member.

BACKGROUND OF THE INVENTION

Such pressure regulating valves are generally used in a refrigerant circuit between an evaporator and a compressor, wherein the refrigerant circuit comprises a condenser connected to the compressor, in which condenser the refrigerant is liquefied and which condenser is connected to the inlet of the evaporator by way of an expansion valve. In such a refrigerant circuit, the pressure regulating valve regulates the pressure in the evaporator and thus regulates the temperature of evaporation. It is thus possible for the evaporation pressure to be regulated largely independently of the suction pressure of the compressor, provided that the pressure in the evaporator is higher than the suction pressure. This enables very precise regulation of the temperature in the regions that are to be cooled by means of the evaporator. By means of such electronic control of the valve it is possible to keep the temperature ranges in those regions constant to within ±0.1° C. Such precision places relatively high demands, however, on the pressure regulating valve. In particular, it must be capable of regulating very accurately relatively small and relatively large refrigerant flows.

Such a pressure regulating valve can regulate the suction pressure of the compressor in the refrigerant circuit also when the refrigerating plant is starting up. In that case, regulation is effected with reference to pressure measurements at the suction side of the compressor. It is thus possible to protect the compressor against overloading as the device is started up.

EP 0 741 257 B1 discloses a valve in a refrigerant circuit, but in that case it is an expansion valve. That expansion valve has a slider member that engages round a guide in the manner of a sleeve. The guide is in the form of a hollow cylinder that has one or more openings in its wall, which openings are covered up to a greater or lesser extent by the slider member. The slider member is driven by an electronically controlled stepper motor.

U.S. Pat. No. 5,964,248 describes a valve intended for regulating superheated vapour. That valve has a relatively large regulating range, that is to say it can control very large amounts of vapour as well as very small amounts of vapour. For that purpose, the slider member is displaceable in a hollow cylindrically shaped guide that has in its wall a number of holes arranged above one another in the direction of movement of the slider member, which holes are exposed gradually as the slider member moves. At its closure end, the slider member has an apron, in the wall of which likewise holes are arranged, so that as the apron moves away from a valve seat initially those holes are exposed and allow vapour to flow through. The manufacture of such a valve is extremely expensive because of all the holes. The parts that are moved relative to one another have to be manufactured with relatively high precision to ensure that the valve remains leakproof.

The problem underlying the invention is to be able to control refrigerant over a large throughput range by means of a valve that can be manufactured inexpensively.

The problem is solved in a pressure regulating valve of the type mentioned at the beginning in that the slider member and the guide co-operate in two sections of their movement relative to one another according to different valve principles.

In that construction, for one section of movement a valve principle can be selected by means of which large amounts of gaseous refrigerant can be regulated or controlled. That valve principle is based essentially on the fact that the surface area of passage is large and the throttling as a result of the co-operation of the slider member and guide is relatively small. A different valve principle can be used for the other regulating region, however, which is based on regulating as small amounts of refrigerant vapour as possible. For small amounts, a correspondingly larger throttle resistance is required. As a result of using two different valve principles, both requirements can now be combined without difficulty.

It is preferred for the slider member and the guide to create a flow resistance that is determined, in a first section of movement, by altering the covering of an opening in one of the two parts, slider member and guide, and, in a second section of movement, by altering the size of a gap between the slider member and guide. In the first section of movement, the valve operates, so to speak, according to the principle of a "needle valve", whereas in the second section it operates according to the "cage valve principle". By covering an opening, or exposing it partially or completely, a flow path for the gaseous refrigerant can be set that enables a relatively large volume flow of the refrigerant. A window, so to speak, is being opened and closed. In the other section of movement, however, it is possible to operate with much more precision by controlling the gap. The same displacement of the slider member relative to the guide then results in a much smaller change in the flow resistance.

It is preferred for the two sections of movement to be contiguous with one another. That has the advantage that the transition from one valve principle, for example from the cage valve principle, to the other valve principle, in the present case the needle valve principle, can occur gradually so to speak. That transition can be taken into account in the regulation.

Preferably the slider member and the guide rest against one another with their end faces in the closed state. This enables the valve to close completely with high reliability. It is less expensive to make end-face contact completely leakproof than to make a seal around the circumference completely leakproof.

Preferably the end-face contact is achieved by the co-operation of a circumferential virtually line-contact end-face sealing edge and a yielding sealing face into which the sealing edge can be pressed. Only relatively small forces are thus required to render the valve leakproof in the closed state, since even relatively small forces effect a relatively large surface pressure on the contact region between the sealing edge and the sealing face, which is what ultimately brings about sealing.

Preferably the drive device can be controlled incrementally and the sealing face is sufficiently yielding for the sealing edge to be able to penetrate by the length of at least one increment. An incrementally controllable drive device is provided, for example, by a stepper motor. Such a stepper motor can only ever adopt predetermined positions which, optionally taking transmission into account, result in stepwise movement of the slider member relative to the guide. It can also happen that the slider member and the guide have not quite come into contact with one another in one position of the stepper motor but the next position of the stepper motor can only be reached if the sealing edge can penetrate into the sealing face. If instead the sealing face is sufficiently yielding to enable penetration of the sealing edge by the length of at least one increment, then it is not necessary to ensure that the stepper motor stops precisely where the sealing edge rests against the sealing face. It is preferred to use a flexible material for the sealing face, for example an elastomer.

Preferably the slider member tapers conically from its contact face towards the head. With that construction it is possible to achieve a valve function based on the needle valve principle. When the slider member moves relative to the guide, a gap between the guide and the slider member becomes larger or smaller as a result of the conical shape of the slider member, which co-operates with an edge of the guide. The angle of incline of the conically widened portion determines the opening, that is to say the change in the size of the gap in relation to the displacement of the slider member relative to the guide.

Preferably the slider member is in the form of a beaker-like hollow cylinder having an open end face, which slider member is held in an auxiliary guide at a distance from the guide. The load on the guide is thus kept small. Since the guide is arranged spaced from the auxiliary guide, the slider member is held at two regions that are relatively far apart from one another in the direction of movement. The risk of the slider member tilting relative to the guide and thus of an undesirable skewed position arising is kept small.

Preferably the slider member has an opening in its circumferential wall between its closed end face and the conically widened portion. That opening is blocked off to a greater or lesser extent by the guide upon movement of the slider member and guide relative to one another. When the slider member is moved further relative to the guide so that the conically widened portion co-operates with the guide, then a transition occurs between the cage valve function and the needle valve function.

Preferably an inlet in a housing is connected to the open end face and an outlet branches off from the housing between the guide and the auxiliary guide. The auxiliary guide can then assume an additional role, which is to seal off the inlet and outlet from one another. The "control edge" of the guide is then arranged at the end of the guide facing the auxiliary guide. The outlet is thus connected, so to speak, to a "control chamber" formed between the guide and the auxiliary guide on the outside of the slider member.

Preferably the auxiliary guide is held in the housing by force fit or interlocking fit. This facilitates manufacture. It is not necessary to secure the auxiliary guide in the housing by soldering, welding or adhesion. Instead, it is sufficient to join the auxiliary guide to the housing, for example, by a bead or by other deformation of the housing.

Preferably the drive device has a spindle drive that co-operates with an end wall of the slider member and the slider member is secured against rotation in the guide. The guide thus assumes a further role. It prevents the slider member from rotating, so enabling displacement of the slider member relative to the guide by rotation of a spindle, which is driven, for example, by a stepper motor. The spindle thus enables a relatively large transmission factor so that the position of the slider member relative to the guide can be controlled with high precision.

Preferably a pressure compensation path is provided, which spans an area of contact between the slider member and guide. It is thus possible for the slider member to be loaded on both its sides in the direction of movement by the same refrigerant pressure. This in turn lessens the load on the drive device of the slider member so that stepper motors can be used, which are themselves not capable of delivering a relatively large force.

Preferably the guide forms a seat for the drive device, so providing a defined position of the drive device relative to the slider member.

BRIEF DESCRIPTION OF THE DRAWINGS

The invention will be described hereinafter in greater detail with reference to a preferred embodiment in conjunction with drawings, in which:

FIG. 2 shows a pressure regulating valve in section in the closed state;

FIG. 3 is a cut-away perspective view of the pressure regulating valve in the opened position;

DETAILED DESCRIPTION OF THE PREFERRED EMBODIMENT

Figure 1:
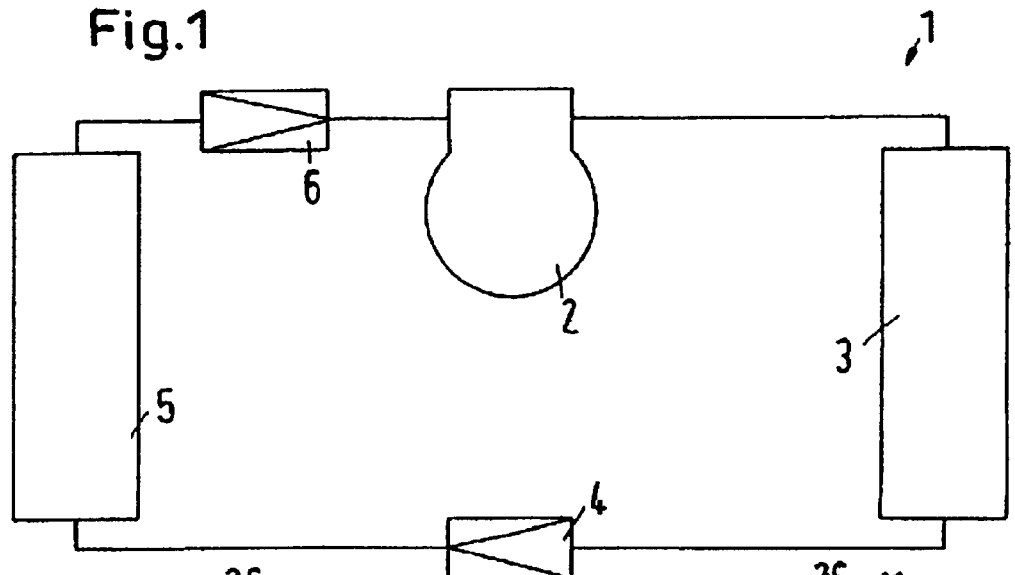
FIG. 1 is a diagrammatic view of a refrigerant circuit.

FIG. 1 shows a refrigerant circuit 1 having a compressor 2 which is connected to a condenser 3. The condenser 3 is connected to an evaporator 5 by way of an expansion valve 4. The evaporator is connected to the compressor by way of a pressure regulating valve 6, which is in this case in the form of a suction pressure regulating valve.

Such a construction of a refrigerant circuit is known. The compressor 2 sucks up refrigerant from the evaporator 5 and compresses it, in the process of which the temperature of the refrigerant rises. The compressed refrigerant is cooled in the condenser 3 and thereby liquefied. The liquefied refrigerant is fed by way of the expansion valve 4 into the evaporator 5, where some of it is already in gaseous form. In the evaporator 5 the liquid refrigerant evaporates as it absorbs heat, it being possible for the vapour also to absorb additional heat. That vapour is then called superheated vapour. The pressure regulating valve 6 is regulated by a control unit (not shown in greater detail), using the temperature in a region to be cooled by the evaporator 5, optionally also in dependence on the evaporation pressure. Where possible, the pressure regulation in the evaporator 5 is effected in such a manner that the evaporation temperature is close to the desired value of the temperature in the region to be cooled so that the cooling required to retain that desired value is already being maintained. The pressure regulating valve has the task, inter alia, of rendering the pressure in the evaporator 5 independent of the suction pressure of the compressor 2.

The pressure regulating valve 6 is shown in greater detail in FIGS. 2 and 3.

The pressure regulating valve 6 has a tubular housing 7 that has an inlet 8 and an outlet 9, branching off at right angles thereto, for the refrigerant (not shown in greater detail). Arranged in the housing 7 is a slider member 10, which is held there by a guide 11, which is connected to the housing 7 by way of a soldered joint 12. The guide 11 is located on the upper side of the outlet 9, that is to say on the side of the outlet 9 remote from the inlet 8.

Arranged below the outlet 9, that is to say on the side of the outlet 9 facing the inlet 8, is an auxiliary guide 13, which also guides the slider member 10. The auxiliary guide 13 can be held in the housing 7 by means of a bead (not shown in greater detail). It can also be held in the housing 7 in a different manner by form fit or interlocking fit. The connection between the housing 7 and the auxiliary guide 13 should be impermeable to gas. Arranged between the auxiliary guide 13 and the slider member 10 is a seal 14, so that there is a gas-impermeable closure in the region of the auxiliary guide 13.

The slider member 10 is in the form of a beaker-shaped hollow cylinder that (based on FIGS. 2 and 3) has at the bottom an open end face 15 and at the top a closed head 16. Arranged in the head 16 is a nut 17, which co-operates with a threaded spindle 18, which is in turn driven by a stepper motor 19. The stepper motor 19 is held in the guide 11, or more precisely in a continuation 20 of the guide 11.

The stepper motor 19 is the element that is able to effect a change in the opening of the pressure regulating valve 6. It is therefore connected to the control device (not shown in greater detail).

The stepper motor 19 is an incrementally operating drive device, that is to say it can only ever bring the slider member 10 into predetermined positions, although those positions are extremely closely adjacent to one another, for example of the order or magnitude of 1/200 mm. Intermediate positions between those individual steps or increments are not, however, possible.

The threaded spindle 18 projects through the head 16 and the nut 17 into the inner space 21 of the slider member 10, which is surrounded by a wall 22.

The slider member 10 has in a middle region of its axial length a circumferential projection 23, on which there rests a sealing ring 24 on the side facing the guide 11. The sealing ring 24 is made of a resilient material, that is to say it is yielding to a certain extent, as will be explained below.

The outer circumference of the slider member 10 decreases from the projection 23 towards the guide 11, that is to say the slider member has a conical portion 25 that co-operates with a control edge on the guide 11, which control edge is in the form of a sealing edge. The sealing edge 26 is located on the radial inside of a circumferential groove 27 on the end face 28 of the guide 11 (see, for example, FIG. 5).

As can be seen especially in FIG. 3, the slider member 10 has in the region of the head 16 two radial projections 29, each of which is guided in an axially running groove 30 in the guide 11. The guide 11 accordingly also secures the slider member 10 against rotation.

The slider member 10 has an opening 31 in the wall 22 above the conical portion 25. In the present case, the opening 31 is circular, but this is not imperative. Other shapes of opening are also possible.

Refrigerant can flow past between the guide 11 and the slider member 10 in order to enter a chamber 32 above the slider member 10. In that case, substantially the same refrigerant pressure acts upon the slider member from both directions of movement. If the corresponding faces on which the refrigerant pressure acts are also of the same size, then the slider member 10 is substantially balanced in every position, that is to say the forces that the stepper motor 19 must deliver are required solely to displace the slider member 10 and not to overcome external forces.

The way in which the pressure regulating valve 6 functions will now be explained in greater detail in conjunction with FIGS. 4 to 7. It should be said in advance that the conical portion 25 together with the sealing edge 26 form a valve that operates according to the needle valve principle, that is to say the edge 26 together with the wall of the conical portion 25 delimit a gap 33 which increases the greater the distance of the projection 23 from the end face 28 of the guide 11. The size of the gap 33 can be controlled with very high precision.

A different valve principle, the so-called cage valve principle, is achieved by the co-operation of the opening 31 with the inside of the guide 11. The opening 31 is covered over to a greater or lesser extent by the inner wall of the guide 11. The further the slider member 10 is moved down, the greater is the free cross-section of flow through the opening 11.

Figure 4:
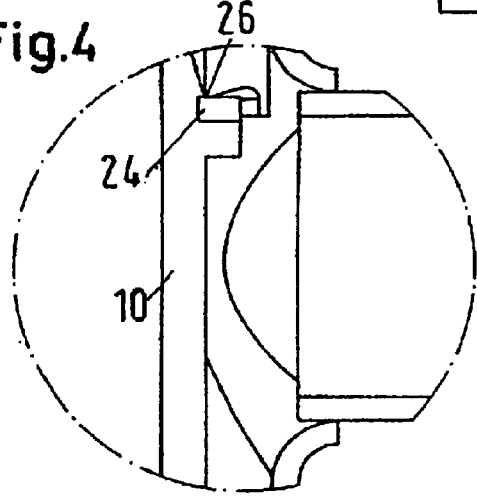
FIG. 4 is an enlarged partial view of the pressure regulating valve in the closed state.

FIG. 4 shows the pressure regulating valve, or more precisely a portion A from FIG. 2, in the closed position. The sealing edge 26 is pressed into the sealing ring 24. The sealing ring 24 is sufficiently yielding for the sealing edge 26 to be able to penetrate by a distance that corresponds at least to one increment of the stepper motor 19 or of the displacement produced by the transmission by the nut 17 and threaded spindle 18. Whilst gaseous refrigerant can then pass through the inner space 21 and the opening 31 into the chamber between the guide 11 and the slider member 10, it cannot flow away to the outlet 9 because the path to the outlet is blocked by the sealing edge 26 that is resting on the sealing ring 24. As has already been said, the sealing ring 24 must be made of a flexible material because the sealing edge 26 must be able to be pressed into the sealing ring 24. In the case of a stepper motor drive, the slider member can be moved only to specific positions because the displacement of the slider member occurs in discrete steps. The result of this is that the sealing edge must be able to move into the sealing ring 24. If that were not possible, the pressure regulating valve 6 might not be leakproof because the sealing edge 26 would not reach the sealing ring 24.

Figure 5:
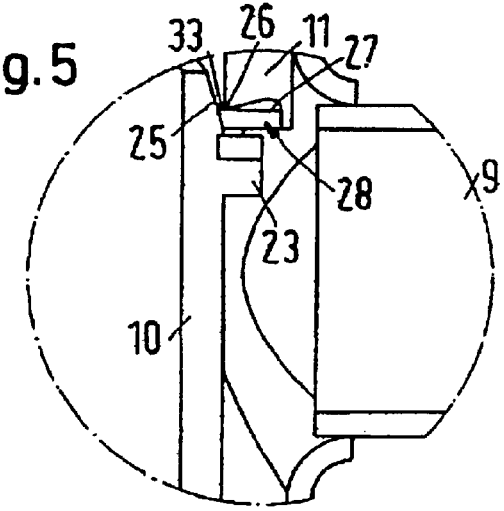
FIG. 5 shows the pressure regulating valve according to FIG. 4 in a slightly opened position.

As already explained, FIG. 5 shows a position of the slider member 10 relative to the guide 11, in which a gap 33 has opened between the wall of the conical portion 25 and the sealing edge 26. In that position it is possible to regulate the flow of refrigerant through the pressure regulating valve 6 with very high precision.

Figure 6:
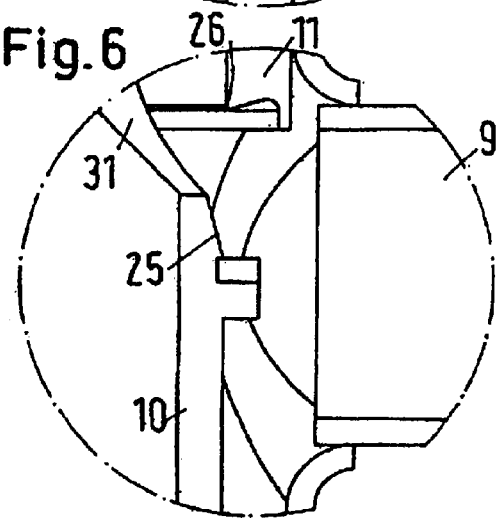
FIG. 6 shows the pressure regulating valve according to FIG. 4 in a more widely opened position.

In FIG. 6 the pressure regulating valve has been opened further, that is to say the slider member 10 has been displaced further towards the inlet 8. The displacement is sufficient for the opening 31 to be no longer completely covered by the guide 11. There is also no longer any direct connection between the sealing edge 26 and the wall of the conical portion 25. The refrigerant flow is dependent substantially only upon the extent to which the opening 31 has been exposed by the inside of the guide 11.

Figure 7:
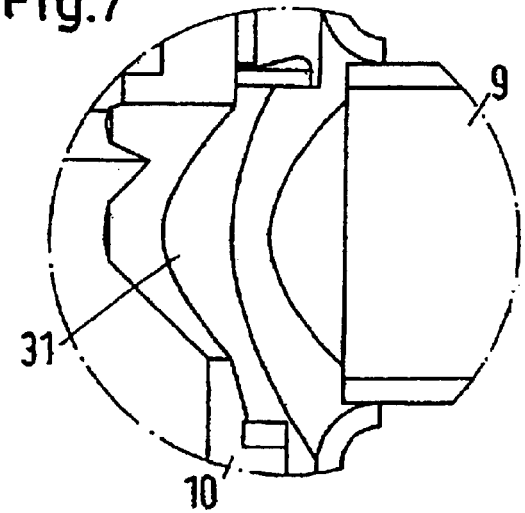
FIG. 7 shows the pressure regulating valve according to FIG. 4 in the fully opened position.

In FIG. 7 the pressure regulating valve 6 has been opened completely, that is to say the opening 31 has been exposed fully so that refrigerant can flow unhindered from the inner space 21 through the opening 31 into the outlet 9.

What is claimed:

1. A pressure regulating valve for a refrigerating plant comprising:

a guide;

a slider member movable relative to the guide between a closed position and a fully open position during which the guide and slider member operate according to different valve principles depending on the position of one relative to the other;

drive means for moving the slider member relative to the guide with variable throttle resistance being created between the guide and the slider member; and wherein during one portion of the movement of the slider member relative to the guide, an edge portion defined by the guide cooperates with a wall portion defined by the slider member to define a gap that progressively increase the closed position to a partially open position and during another portion of the movement that begins after the edge portion clears the wall portion, one of the slider member and the guide defines an opening for allowing flow therethrough, and the other of the slider member and the guide defines a portion that progressively covers or uncovers the opening.

2. A valve according to claim 1, wherein the two portions of relative movement are contiguous with one another.

3. A valve according to claim 1 wherein the slider member and the guide each define an end face, and wherein the end faces rest against one another when the slider member and the guide are in a closed state.

4. A valve according to claim 3, wherein the end-face contact is achieved by the co-operation of a circumferential virtually line-contact end-face sealing edge and a yielding sealing face into which the sealing edge can be pressed.

5. A valve according to claim 4, wherein the drive means can be controlled incrementally and the sealing face is sufficiently yielding for the sealing edge to be able to penetrate by the length of at least one increment.

6. A valve according to claim 1 wherein that the slider member includes a head and a conically widened portion formed by a conically tapered surface extending from the endface define by the slider member towards the head.

7. A valve according to claim 1 wherein the slider member is in the form of a beaker-like hollow cylinder having an open end face, which slider member engages an auxiliary guide at a distance from the guide.

8. A valve according to claim 7, wherein the slider member has an opening in a circumferential wall defined thereby, the opening being between a closed end face of the slider member and the a conically widened portion.

9. A valve according to claim 7 further comprising a housing is connected to the open end face and an outlet branches off from the housing between the guide and the auxiliary guide.

10. A valve according to claim 9, wherein the auxiliary guide is held in the housing by a force fit or an interlocking fit.

11. A valve according to claim 1 wherein the drive means includes a rotatable spindle drive that co-operates with an end wall of the slider member and the slider member is secured against rotation in the guide.

12. A valve according to claim 1 wherein a pressure compensation path is provided, which spans an area of contact between the slider member and the guide.

13. A valve according to claim 1 wherein the guide forms a seat for the drive device.

* * * * *

UNITED STATES PATENT AND TRADEMARK OFFICE
CERTIFICATE OF CORRECTION

PATENT NO. : 6,827,330 B2
DATED : December 7, 2004
INVENTOR(S) : Jorgen Holst et al.

It is certified that error appears in the above-identified patent and that said Letters Patent is hereby corrected as shown below:

Column 7,
Line 16, please change "increase" insert -- increases from --.

Signed and Sealed this

Fifth Day of April, 2005

JON W. DUDAS
*Director of the United States Patent and Trademark Office*